Sept. 21, 1943.　　　A. J. LAUTMANN　　　2,329,917
DISPENSING DEVICE
Filed Sept. 8, 1941　　　2 Sheets-Sheet 1
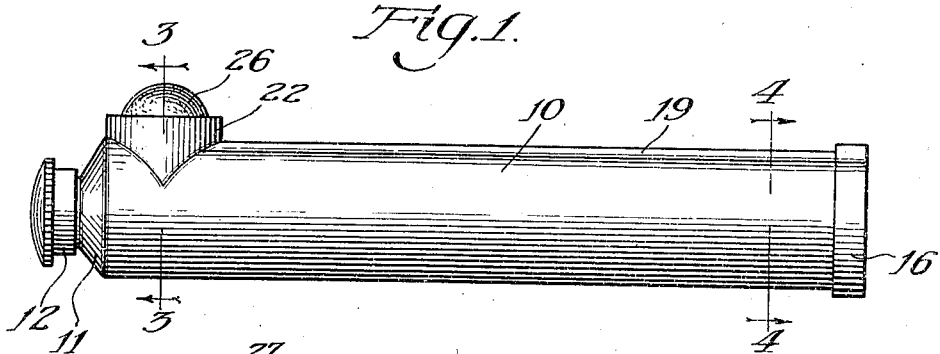
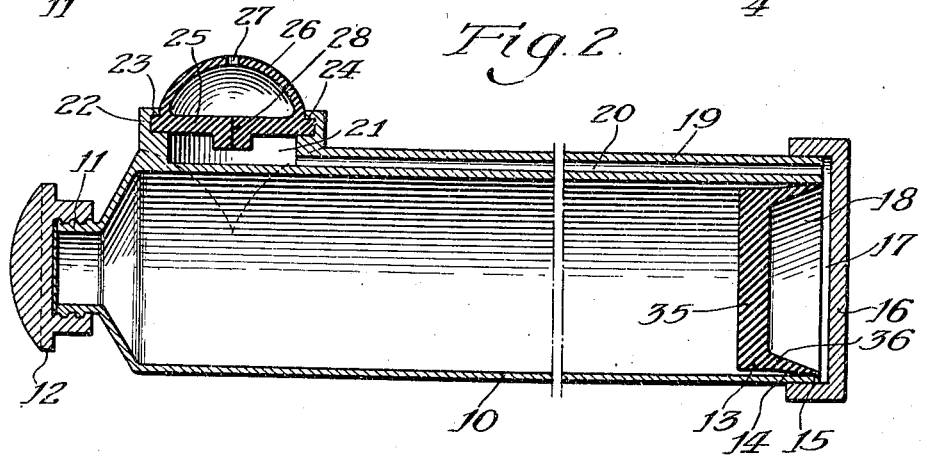
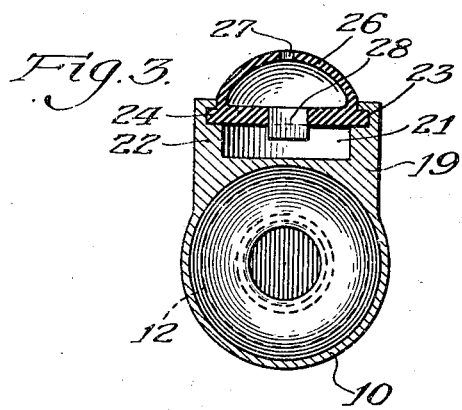
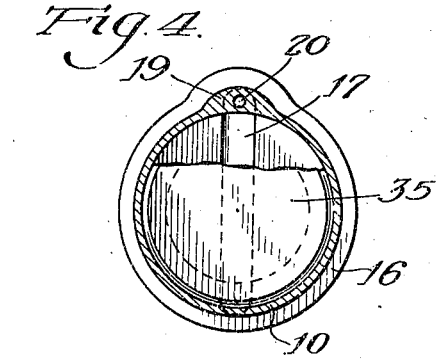
Inventor:
Alfred J. Lautmann
By Wallace & Cannon
His Attorneys Sept. 21, 1943.   A. J. LAUTMANN   2,329,917
DISPENSING DEVICE
Filed Sept. 8, 1941   2 Sheets-Sheet 2
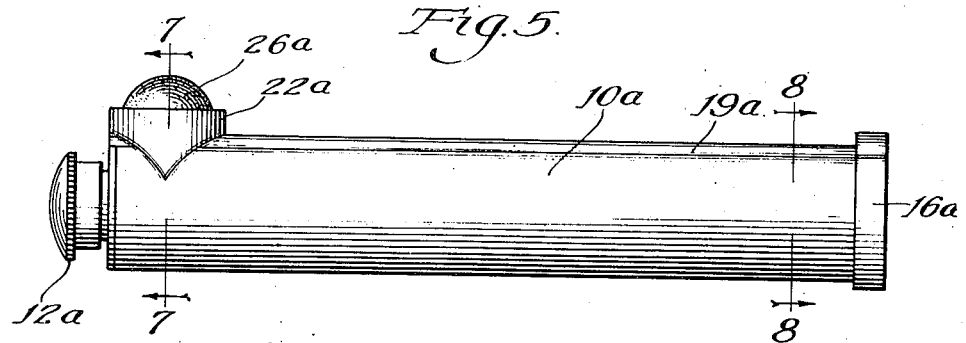
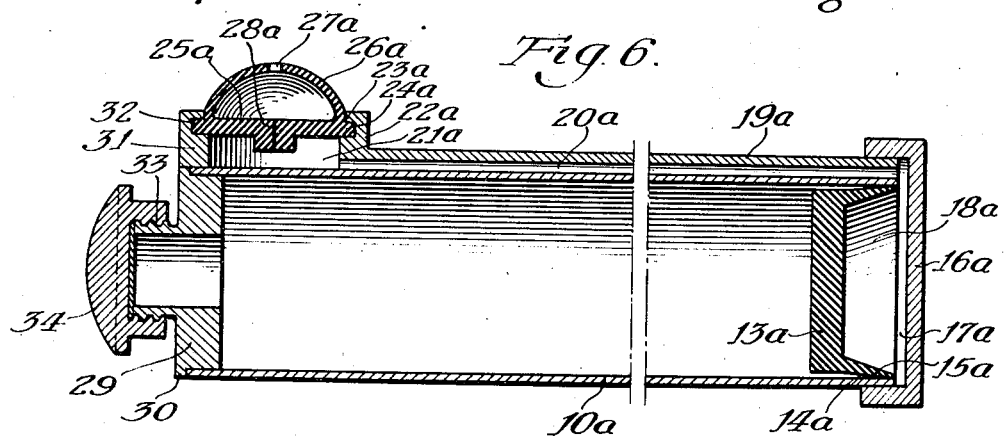
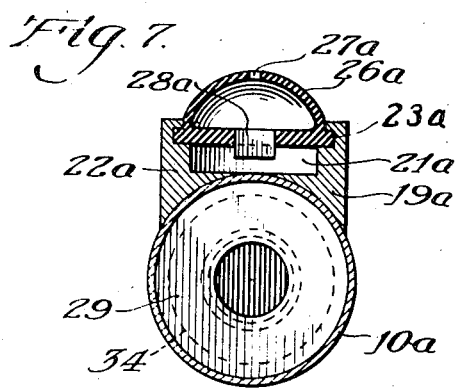 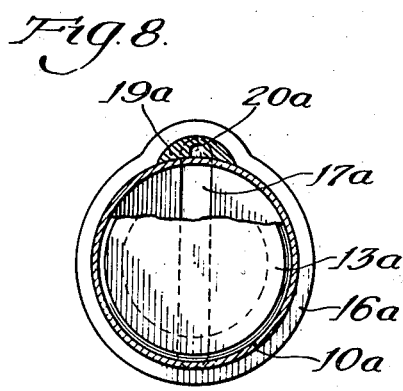
Inventor:
Alfred J. Lautmann
By: Wallace & Cannon
His Attorneys Patented Sept. 21, 1943

2,329,917

UNITED STATES PATENT OFFICE 2,329,917

DISPENSING DEVICE

Alfred J. Lautmann, Detroit, Mich., assignor to Iodent Chemical Company, Detroit, Mich., a corporation of Michigan Application September 8, 1941, Serial No. 410,092

15 Claims. (Cl. 221—76)

This invention relates to a dispensing device for dispensing vendable viscous substances such, for example, as toothpaste, shaving cream, face creams, depilatory creams, and like or analogous materials, creams and pastes.

An object of the invention is to effect and realize a novel dispensing device for dispensing materials of the character indicated and in the use of which dispensing device the dispensing operation may be effected by the use of only one hand, that is, the new dispensing device may be held in and operated entirely by one hand, thus leaving the other hand free to use or dispose of the material dispensed from the new dispensing device as, for example, to hold a toothbrush or a shaving brush for the reception of paste or cream dispensed from the new dispensing device, or to apply face or cold cream or the like to the face; or for other uses.

Another object of the invention is to effect and realize a dispensing device for dispensing vendible materials in the form of creams, pastes or the like and which embodies a novel combination and arrangement of elements for dispensing the paste, cream or the like from the new dispensing device, as desired.

Another object of the present invention is to construct and arrange the new dispensing device in such a manner that it is relatively simple in construction and inexpensive to manufacture and so that it may readily be made of plastic as well as other suitable materials.

An additional object of the invention is to embody therein a novel pneumatically operated piston which is so constructed and arranged that it may readily be operated to expel or dispense paste, cream or the like from the new dispensing device while, at the same time, preventing the paste, cream or the like from escaping past the piston during the dispensing operation.

A further object of the invention is to effect and realize a novel dispensing device for creams, pastes and the like which embodies, in combination, a generally tubular-shaped container or storage receptacle for paste, cream or the like, a pneumatically operated piston for dispensing the paste, cream or the like from the generally tubular-shaped container, and a novel manually operable air pumping device carried by the generally tubular-shaped container for operating the piston to dispense the contents of the container or storage receptacle therefrom as and when desired.

Other and further objects of the present invention will be apparent from the following description and claims and will be understood by reference to the accompanying drawings which, by way of illustration, show preferred embodiments and the principles thereof and what I now consider to be the best modes in which I have contemplated applying those principles. Other embodiments of the invention embodying the same or equivalent principles may be used and structural changes may be made as desired by those skilled in the art without departing from the present invention and the purview of the appended claims.

In the drawings,

Fig. 1 is a side elevational view of a dispensing device embodying a preferred form of the invention;

Fig. 2 is an enlarged central longitudinal sectional view of the preferred form of dispensing device which is illustrated in Fig. 1, a part thereof having been broken away;

Fig. 3 is an enlarged transverse sectional view, on line 3—3 on Fig. 1, illustrating a preferred form of the novel air pumping device which is embodied in the new dispensing device;

Fig. 4 is an enlarged transverse sectional view on line 4—4 in Fig. 1;

Fig. 5 is a side elevational view illustrating a modified form of the invention;

Fig. 6 is an enlarged central longitudinal sectional view of the modified form of the new dispensing device which is shown in Fig. 5, a part thereof having been broken away;

Fig. 7 is an enlarged transverse sectional view on line 7—7 in Fig. 5; and

Fig. 8 is a transverse sectional view on line 8—8 in Fig. 5.

A preferred form of the new dispensing device is illustrated in Figs. 1 to 4, inclusive, of the drawings and comprises a generally tubular-shaped and preferably cylindrical storage receptacle or container 10, which may be made of any suitable material which is non-absorbent to water and resistant to the action of the pastes, creams and the like to be stored therein, a suitable material for this purpose being, for example, any of various resinous plastic materials and the like.

The container body 10 includes an externally threaded neck or end portion 11, which provides a dispensing outlet, which is normally closed by means of an internally threaded detachable closure cap 12 which may be screwed thereon or, if desired, any of various other forms of suitable closures may be employed in place of the closure cap 12.

A pneumatically operated piston 13 is slidably mounted in the generally tubular-shaped container body or storage receptacle 10 of the new dispensing device, and the piston 13 may be made of any suitable flexible material which is non-absorbent to water and resistant to the action of the creams, pastes and the like which may be stored in the container body 10. Thus a suitable material for making the piston 13 may be a suitable rubber, which is non-absorbent to water and other fluids and which is resistant to the action of the various materials, referred to above, and which may be stored in the container body or storage receptacle 10 of the new dispensing device.

It will be noted, in this connection, and as shown in Fig. 2, that the body 35 of the piston 13 is somewhat smaller in diameter than the inside diameter of the container body or storage receptacle 10 so that the body 35 of the piston 13 will slide readily in the generally tubular-shaped container body or storage receptacle 10.

It will also be noted, by reference to Fig. 2, that the piston 13 is recessed on its rear side, providing a well 18, and that the outer wall 36 of the piston 13, which surrounds the well 18, is inclined or tapered, as at 14, from its axially inner or front end toward its axially outer or rear end, thereby providing a flexible trailing edge 15 at the axially outer or rear end of the piston 13 which frictionally engages or wipes against the inner surface of the container body or storage receptacle 10, for reasons which will be made apparent hereinafter.

The rear end of the generally tubular-shaped container or storage receptacle 10 is, as shown in Fig. 2, closed by a cap or closure member 16 which may be adhesively or otherwise permanently secured to the container or storage receptacle 10, in any suitable manner.

Formed in the closure member or cap 16, on the inner surface thereof (Figs. 2 and 4), is an air passage 17 which extends diametrically relative to and across the closure member or cap 16 and relative to the tubular container body or storage receptacle 10, and, as best shown in Fig. 4, the passage 17 communicates with the interior of the container body or storage receptacle 10 and with the well 18 of the piston 13.

Formed upon the top wall of the generally tubular container body or storage receptacle 10, as seen in Figs. 1, 2 and 3, and integrally therewith, is a rib 19 which extends longitudinally of the container body 10. Provided centrally in the rib 19 and extending longitudinally thereof, is an air passage 20 which communicates, at its rear end, with the air passage 17.

As shown in Figs. 2 and 3, the air passage 20 opens, at its front end, into an air chamber 21 which is provided in a boss 22 which may be formed as an integral enlargement of the container body or storage receptacle 10.

Formed in the boss 22, on the inner surface thereof, is a substantially annular recess 23, and seated in this recess 23, and thus anchored to the boss 22, is the marginal or peripheral edge portion 24 of a substantially annular and flexible and elastic diaphragm or ring 25 which is preferably made of a suitable quality of rubber, which is non-absorbent to water and other fluids and resistant to the action of the creams, pastes and like materials which may be stored in the container body or storage receptacle 10. A self-sealing air passage or slit 28 is provided in the diaphragm 25, for reasons which will be referred to presently.

A dome-shaped bellows or air-pumping member 26 is formed integrally with the diaphragm 25 and provided in the dome-shaped bellows 26 is an air inlet opening 27.

In the manufacture of the new dispensing device which is illustrated in Figs. 1 to 4, inclusive, the generally tubular-shaped container body or storage receptacle 10 may be filled, in any suitable manner, with any material which it may be desired to store and vend therein, as, for example, toothpaste, shaving cream, face cream, depilatory cream or paste, or other analogous vendible viscous materials, as stated above. The container body or storage receptacle 10 may be filled by inserting the contents thereof into the body 10 through the rear end thereof (right-hand end as seen in Fig. 2) whereupon the piston 13 may be inserted into the container body or storage receptacle 10, through the open rear end thereof. The closure cap or member 16 may then be arranged in position of use and secured upon the container body 10, in any suitable manner as, for example, in case the container body 10 and the closure member or cap 16 are made of plastic, resinous material, by applying a little solvent, such as acetone, between the closure cap or member 16 and the container body 10 so as, in effect, to fuse the closure cap or member 16 onto the container body 10 or, if desired, a suitable adhesive may be used for this purpose.

In the use of the new dispensing device which is illustrated in Figs. 1 to 4, inclusive, the vendible material, that is, the paste, cream or the like may be extruded or dispensed from the container body or storage receptacle 10 by first removing the closure cap 12 and then, while holding the new dispensing device in and by the fingers of one hand, manipulating, that is, alternately compressing and expanding or releasing the dome-shaped bellows or air-pumping member 26 by means of the thumb on the hand in which the container body or storage receptacle 10 is held. During the air-pumping operation, that is, as and when the bellows 26 is being compressed or collapsed, the operator's thumb is disposed over the top of the bellows 26 so as to close the air inlet 27 therein and as the bellows 26 is being released the pressure of the thumb is released so as to open the air inlet 27 and allow air to enter into the bellows 26.

Accordingly, as the bellows 26 is thus alternately collapsed and expanded, it forces air through the narrow slit or valve opening 28 in the flexible diaphragm or ring 25 into the air chamber 21, thence into the air passages 20 and 17, and thence into the interior of the container body 10 and into the well 18 of the piston 13, thereby forcing the piston 13 in and axially along the container body or storage receptacle 10 so as to extrude or dispense a desired amount of paste, cream or the like from the container body or storage receptacle 10 through the dispensing outlet 11.

It will be noted that after each pumping operation, that is, after each operation of collapsing the bellows 26 and forcing air through the valve opening 28 in the diaphragm 25, the self-sealing valve 28 in the flexible and elastic diaphragm 25 closes so as to prevent the escape of air from the air chamber 21 and the air passages 20—17 and so as to allow the pressure of the air in the system 21—20—17—10—18 to accumulate or build up to effect and assure operation of the piston 13.

It will be noted, in this connection, that as air is thus forced into the well 18 of the piston 13 the flexible side wall 36 and the trailing edge portion 15 of the piston 13 are expanded radially outwardly against the inner wall of the generally tubular container body or storage receptacle 10 so as to effect a tight seal between the piston and the wall of the container body 10 and thus prevent the contents of the container body 10 from escaping rearwardly past the piston 13 as the latter is forced forwardly during the dispensing operation.

A slightly modified form of the invention is illustrated in Figs. 5 to 8, inclusive, of the drawings, and in this form of the invention those parts which are similar or comparable to corresponding parts in the form of the invention shown in Figs. 1 to 4, inclusive, have been given the same reference numerals, followed by the letter "a".

The modified form of the new dispensing device which is illustrated in Figs. 5 to 8, inclusive, of the drawings is, in general, similar or comparable in construction and operation to the form of the invention which is shown in Figs. 1 to 4, inclusive, but differs therefrom in construction in several respects, one of which is the fact that instead of having the neck or outer end portion of the container body or storage receptacle 10a formed integrally with the container body or storage receptacle (as in the form of the invention which is illustrated in Figs. 1 to 4, inclusive), the container body or storage receptacle 10a is provided with a closure member or plug 29 which is fitted into one end of the generally tubular-shaped container body or storage receptacle 10a which may be secured in position therein in any suitable manner as, for example, when the parts are made of plastic, resinous material, by coating the peripheral edge portion of the closure plug 29, and that portion of the inner surface of the container body 10a which it engages when in position of use (see Fig. 6), with a suitable solvent such, for example, as acetone. However, a suitable adhesive or adhesives may also be used for this purpose, if desired.

As shown in Fig. 6, the closure member or plug 29 has a substantially annular-shaped flange 30 which abuts the front end wall of the container body 10a, and formed on the closure member 29 is an externally threaded neck portion 33, which provides a dispensing outlet, which may be provided with a suitable closure such as the screw-threaded closure cap 34.

The modification shown in Figs. 5, 6, 7 and 8 also differs from the form of the invention which is shown in Figs. 1 to 4, inclusive, in that instead of having a boss, such as 19, formed integrally therewith, as does the form of the container shown in Figs. 1 to 4, inclusive, the container body 10a has a separate member 19a mounted on the top wall and on the outer side and extending lengthwise thereof and this member 19a is provided with a groove (Fig. 8) which extends lengthwise thereof and is closed on its lower side by the upper wall of the container body 10a to provide the air passage 20a.

As may be seen by reference to Fig. 6, the member 19a includes a substantially annular and upwardly extending front portion or boss 22a—32 which is provided, on its inner surface, with a channel-shaped and substantially annular groove 24a—32 which receives the marginal edge portion 24a of the flexible and elastic diaphragm 25a.

The flexible, elastic diaphragm 25a is provided centrally thereof with a slit 28a which provides a normally closed and self-sealing air valve opening, which corresponds to the valve opening 28 in the form of the invention which is shown in Figs. 1 to 4, inclusive, and formed integrally with the diaphragm 25a is a dome-shaped air-pumping member or bellows 26a which is provided at the top and centrally thereof with an air inlet opening 27a which corresponds to the air inlet opening 27 in the air-pumping member or bellows 27 which is embodied in the form of the invention shown in Figs. 1 to 4, inclusive.

The member 19a—22a—31 may be secured in position upon and to the upper wall of the container body 10a in any suitable manner as, for example, when these parts are made of plastic resinous material by applying a suitable solvent, such as acetone, to those portions of the bottom surface of the member 19a and the upper surface or wall of the container body 10a so as, in effect, to fuse or adhesively secure these parts together or, if desired, a suitable adhesive or adhesives may be employed for this purpose.

The use and operation of the modified form of the invention which is illustrated in Figs. 5 to 8, inclusive, are substantially the same as hereinbefore described in reference to the preferred form of the new dispensing device, which is shown in Figs. 1 to 4, inclusive, and hence need not be described here again.

It will thus be seen from the foregoing description, considered in conjunction with the accompanying drawings, that the present invention accomplishes its intended objects, includes those hereinbefore set forth, and other objects of the invention, and effects and realizes a novel dispensing device for dispensing vendible viscous commodities such, for example, as toothpastes, shaving creams, face creams, depilatory creams and the like.

It will also be seen from the foregoing description, considered in conjunction with the accompanying drawings, that the present invention provides a novel dispensing device for dispensing creams, pastes and the like, and which may be easily and readily held and manipulated by the user thereof in and by only one hand, thus leaving the user's other hand free to operate upon or to apply the material dispensed from the container body of the new dispensing device, as, for example, to hold a toothbrush for the reception of toothpaste or to apply the cream dispensed from the device to the skin, and for other uses.

While I have illustrated and described selected embodiments of my invention, it is to be understood that these are capable of variation and modification and I therefore do not wish to be limited to the precise details set forth but desire to avail myself of such changes and alterations as fall within the purview of the following claims.

I claim:

1. A dispensing device comprising, in combination, a generally tubular-shaped container body or storage receptacle adapted to contain a vendible paste, cream or like viscous material and having a dispensing outlet through which said paste, cream or like material may be extruded and dispensed, as desired, a piston slidably mounted in said container body for extruding the contents of said container body through said dispensing outlet, said dispensing device comprising means providing a passageway extending longitudinally of said container body and exteriorly thereof relative to the interior of said container body and forming an air-conducting passage for conducting air pressure into the interior of said container body and against said piston so as move said piston in said container body and extrude the contents thereof through said dispensing outlet, as desired, and means positioned exteriorly of the periphery of the container and connected with the said air-conducting passage for forcing air under pressure through said air-conducting passage into the interior of said container body and against said piston comprising a manually operable air pumping device carried by said container body and constructed and arranged relative to said container body or storage receptacle so that said dispensing device may be held by the user thereof in, and so that said air-pumping device may be manipulated by, only one and the same hand and in a direction substantially at right angles relative to the longitudinal axis of said generally tubular-shaped container body and relative to the direction of movement of said piston therein.

2. A dispensing device as defined in claim 1 in which said air-conducting passage comprises a portion extending longitudinally of said container body and a portion extending transversely of said container body and in communication with the interior of said container body at the rear thereof and rearwardly of said piston.

3. A dispensing device as defined in claim 1 in which said container body includes a generally tubular-shaped side wall and a rear wall and in which said air-conducting passage includes a portion formed upon the side wall of said container body and extending longitudinally thereof and in which said air-conducting passage includes a portion formed upon the rear wall of said container body and communicating with the interior of said container body at the rear thereof and rearwardly of said piston.

4. A dispensing device as defined in claim 1 in which said piston comprises a piston including a main body portion somewhat smaller in diameter than the internal diameter of said container body and having a well formed therein at the rear side thereof and in which said piston includes a relatively thin flexible wall portion surrounding said well adapted to be flexed radially outwardly against and into frictional engagement with the wall of said container body by the pressure of air forced through said air-conducting passage and into said well by said air-pumping device.

5. A dispensing device as defined in claim 1 in which said piston comprises a piston including a main body portion somewhat smaller in diameter than the internal diameter of said container body and having a well formed therein at the rear side thereof and in which said piston includes a relatively thin flexible wall portion surrounding said well, and in which the flexible wall portion of said piston is tapered radially outwardly from its axially inner or front end toward its axially outer or rear end and merges at its front end into the main body portion of said piston where it has substantially the same diameter as the main body portion of piston, and in which the flexible wall portion of said piston is adapted to be flexed radially outwardly against and into frictional engagement with the wall of said container body by the pressure of air forced through said air-conducting passage and into said well by said air-pumping device.

6. A dispensing device as defined in claim 1 in which said air-conducting passage includes, as a part thereof, an air chamber provided on the wall of said container body adjacent the front of the latter and in communication with said air-conducting passage, and in which a normally closed and self-closing air valve is arranged between said air chamber and said air-conducting passage, and in which said air pumping device includes a manually operable air pumping member carried by said container body and arranged outwardly of said air chamber for forcing air through said normally closed air valve and into said air-conducting passage.

7. A dispensing device as defined in claim 1 in which said air-conducting passage includes a portion having a flexible, elastic diaphragm extending thereacross and having a slit formed therein providing a manually closed and self-sealing air valve and in which said air pumping device includes a manually operable air pumping member carried by said container body for forcing air under pressure through said normally closed and self-sealing air valve and thence through said air-conducting passage into the interior of said container body and against said piston.

8. A dispensing device as defined in claim 1 in which said air-conducting passage includes a portion having a flexible, elastic diaphragm extending thereacross and having a slit formed therein providing a normally closed and self-sealing air valve and in which said air pumping device includes a manually operable flexible bellows carried by said container body for forcing air under pressure through said air valve and thence through said air-conducting passage into the interior of said container body and against said piston.

9. A dispensing device as defined in claim 1 in which said air-conducting passage includes a portion having a flexible, elastic diaphragm extending thereacross and having a slit formed therein providing a normally closed and self-sealing air valve and in which said air pumping device includes a substantially dome-shaped and collapsible rubber bellows carried by said container body and having an air inlet opening therein for forcing air under pressure through said air valve and through said air-conducting passage into the interior of said container body and against said piston.

10. A dispensing device as defined in claim 1 in which said air-conducting passage includes an air chamber provided on the wall of said container body at the top and adjacent the front thereof and in which a flexible, elastic diaphragm, carried by said container body, extends across said air chamber and has a relatively narrow slit formed therein providing a normally closed and self-sealing air valve, and in which said air pumping device includes a manually operable air pumping member carried by said container body for forcing air under pressure through said normally closed air valve and into said air chamber and through air-conducting passage into the interior of said container body and against said piston.

11. A dispensing device as defined in claim 1 in which said air-conducting passage includes a chamber provided on the wall of said container body at the top and adjacent the front thereof and in which a flexible, elastic diaphragm, carried by said container body, extends across said air chamber and has a relatively narrow slit formed therein providing a normally closed and self-closing air valve, and in which said air pumping device includes a flexible and manually operable bellows carried by said container body for forcing air under pressure through said normally closed air valve into said air chamber and air-conducting passage and thence into the interior of said container body and against said piston.

12. A dispensing device as defined in claim 1 in which said air-conducting passage includes an air chamber provided on the wall of said container body at the top and adjacent the front thereof and in which a flexible, elastic diaphragm, carried by said container body, extends across said air chamber and has a relatively narrow slit formed therein providing a normally closed and self-closing air valve, and in which said air pumping device includes a substantially dome-shaped flexible bellows carried by said container body and having an air inlet opening therein for forcing air under pressure through said air valve into said air chamber and through said air-conducting passage into the interior of said container body and against said piston.

13. A dispensing device as defined in claim 1 in which said air-conducting passage includes an air chamber provided on the wall of said container body at the top and adjacent the front thereof and in which a flexible, elastic diaphragm, carried by said container body, extends across said chamber and has a relatively narrow slit formed therein providing a normally closed and self-closing air valve, and in which said air pumping device includes a substantially dome-shaped rubber bellows formed integrally with said diaphragm and having an air inlet opening therein for forcing air under pressure through said air valve into said air chamber and through said air-conducting passage into the interior of said container body and against said piston.

14. A dispensing device as defined in claim 1 in which said air-conducting passage includes an air chamber provided on the wall of said container body at the top and adjacent the front thereof and in which a flexible, elastic diaphragm, carried by said container body, extends across said air chamber and has a relatively narrow slit formed therein providing a normally closed and self-sealing air valve, and in which said air pumping device includes a manually operable air pumping member carried by said container body for forcing air under pressure through said normally closed air valve into said air chamber and into air-conducting passage, and in which said container body has a boss formed on the wall thereof having a substantially channel-shaped groove formed therein and in which said flexible, elastic diaphragm includes a marginal or peripheral edge portion anchored in said groove.

15. A dispensing device as defined in claim 1 in which said air-conducting passage includes an air chamber provided on the wall of said container body at the top and adjacent the front thereof and in which a flexible, elastic diaphragm, carried by said container body, extends across said air chamber and has a relatively narrow slit formed therein providing a normally closed and self-closing air valve, and in which said air pumping device includes a manually operable air pumping member carried by said container body for forcing air under pressure through said normally closed air valve into said air chamber and into said air-conducting passage, and in which said container has a member mounted on the top wall thereof having a substantially channel-shaped groove formed therein and in which said flexible diaphragm includes a marginal or peripheral edge portion anchored in said groove and in which said container body has a plug arranged therein at, and closing, the front end thereof and in which said plug has a dispensing outlet formed therein and in which said plug includes a portion disposed outwardly of said container body and providing a substantially annular-shaped flange which bears against the front end or edge of the wall of said container body.

ALFRED J. LAUTMANN.